Figure 1:
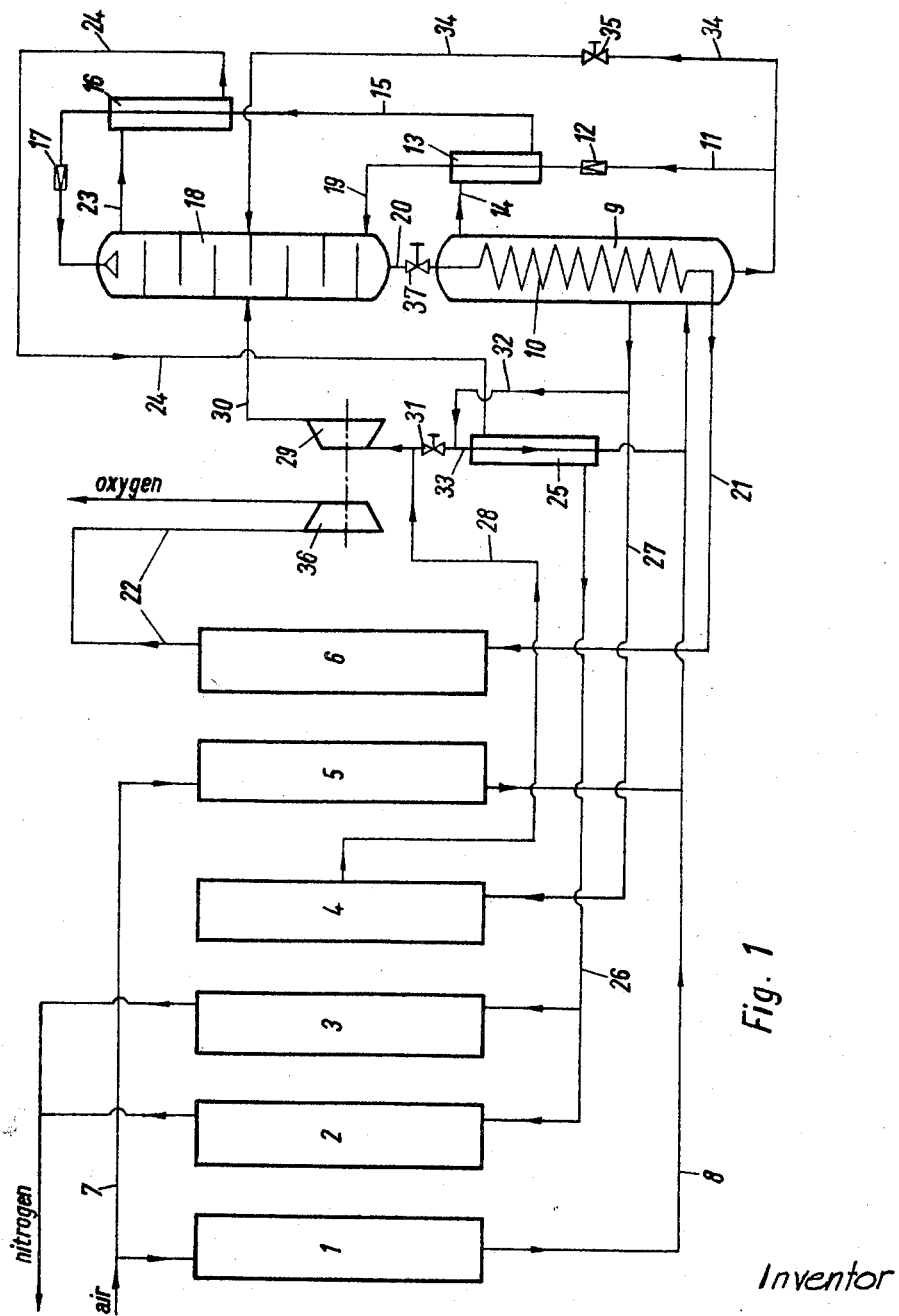

Inventor
FRITZ JAKOB
By Toulmin & Toulmin
Attorneys

Inventor
FRITZ JAKOB
By Toulmin & Toulmin
Attorneys

Aug. 9, 1966  F. JAKOB  3,264,831
METHOD AND APPARATUS FOR THE SEPARATION OF GAS MIXTURES
Filed Jan. 12, 1962  3 Sheets-Sheet 3

Inventor
FRITZ JAKOB
By Toulmin & Toulmin
Attorneys

# United States Patent Office 3,264,831
Patented August 9, 1966

3,264,831
METHOD AND APPARATUS FOR THE SEPARATION OF GAS MIXTURES
Fritz Jakob, Achmuhle, near Wolfratshausen, Germany, assignor to Linde Aktiengesellschaft, Wiesbaden, Germany
Filed Jan. 12, 1962, Ser. No. 165,789
8 Claims. (Cl. 62—13)

The present invention relates to the separation of gas mixtures at low temperatures by partial condensation and rectification, more particularly, to the production of moderately pure oxygen by the separation of air in two separation stages.

It is known in the art to separate air in a two stage rectification column. The air is introduced into a preseparation stage and pure oxygen is removed from the sump of the main separating stage in a liquid phase. Oxygen-rich liquid is withdrawn from the sump of the preseparating stage, expanded and then introduced into the main separating stage at a point between the top and bottom thereof. Gaseous nitrogen accumulates in the head of the preseparating stage and condenses when passed in heat-exchange relationship with the liquid pure oxygen accumulating in the bottom of the main separating stage which oxygen is vaporized. A portion of this condensed nitrogen is then introduced into the main separation stage at the head thereof for use as a washing liquid.

In order to satisfactorily accomplish the heat-exchange between the gaseous nitrogen of the preseparating stage and the liquid pure oxygen of the main separating stage, it is necessary that the pressure in the preseparating stage with respect to the pressure of the main separating stage is sufficiently high so that the nitrogen in the preseparating stage condenses at the temperature of the oxygen boiling under the pressure of the main separating stage.

This difference in pressure necessary for the heat-exchange process and the absolute working pressure of the preseparating stage must both be very high in the conventional processes of low-temperature air separation. Accordingly, such processes have the disadvantage that a large amount of energy is required in order to compress the air which is to be separated to the pressure under which the preseparating stage operates. In many cases this large amount of energy makes the economy of the process questionable.

It is therefore the principal object of the present invention to provide a process and apparatus for economically separating a gas mixture to obtain a gas product therefrom which need only be moderately pure.

It is a further object of the present invention to provide a method and an apparatus for the low-cost separation of air into oxygen which is about 70 to 90% pure.

It is an additional object of the present invention to provide a method and an apparatus for the low-temperature two stage rectification of a gas mixture wherein the operating pressure of the preseparating stage is considerably lower than in conventional processes.

The process of the present invention essentially comprises introducing the gas mixture to be sepaarted into the preseparating stage of a two stage rectification column. The gas mixture is partially condensed therein at constantly decreasing temperatures concurrently with a rectification. The product of the rectification in the preseparating stage is then treated in the second or main separating stage by rectification to further purify the product.

The liquid intermediate product is withdrawn from the sump of the preseparating stage and introduced into the lower portion of the main separating stage after being expanded and evaporated by being passed in heat-exchange relationship with the residual gas mixture withdrawn from the upper part of the preseparating stage. The main product of this process is then withdrawn from the sump of the main sepaarting stage in the liquid phase and passed through the preseparating stage in heat-exchange relationship with the incoming gas mixture which is to be separated. This heat-exchange relationship vaporizes the main product and partially condenses the gas mixture.

With this procedure the working pressure in the preseparating stage with respect to the pressure of the main separating stage is considerably reduced. Accordingly, a substantial reduction is made in the consumption of energy required for the compression of the gas mixture.

The main product which is withdrawn in the liquid phase from the sump of the main separating stage is expanded before being admitted to the heat-exchange in the preseparating stage. This expansion will decrease the boiling point of the main product and the difference in the temperatures of the substances in the heat-exchange will be increased.

The main product may be evaporated in the heat exchanger of the preseparating stage at subatmospheric pressure. Accordingly, a pump is used to withdraw the gaseous main product out of the arrangement.

Since the boiling points of the liquid intermediate product and the residual gas mixture both formed in the preseparating stage do not differ very much from each other, and since the gas mixture to be separated and the main product are in counterflow relationship with each other at varying temperatures in the heat exchanger, the working pressure of the preseparating stage can be lower with respect to the pressure of the main separating stage than the ratios of pressures of conventional methods for the separation of gas mixtures.

A modification of this invention enables a main product to be obtained of a greater purity by only partially condensing the main product as it flows through the heat exchanger in the preseparating stage. As a result of this partial evaporation the liquid remaining therefrom is enriched with the higher boiling point component of the gas mixture to be separated and, accordingly, can be withdrawn as a subproduct in the liquid phase from the gaseous, moderately pure main product.

The subproduct can then be evaporated by passing it through the preseparating stage in heat-exchange relationship to the gas mixture to be separated or in a heat exchanger outside of the preseparating stage.

Figure 2:
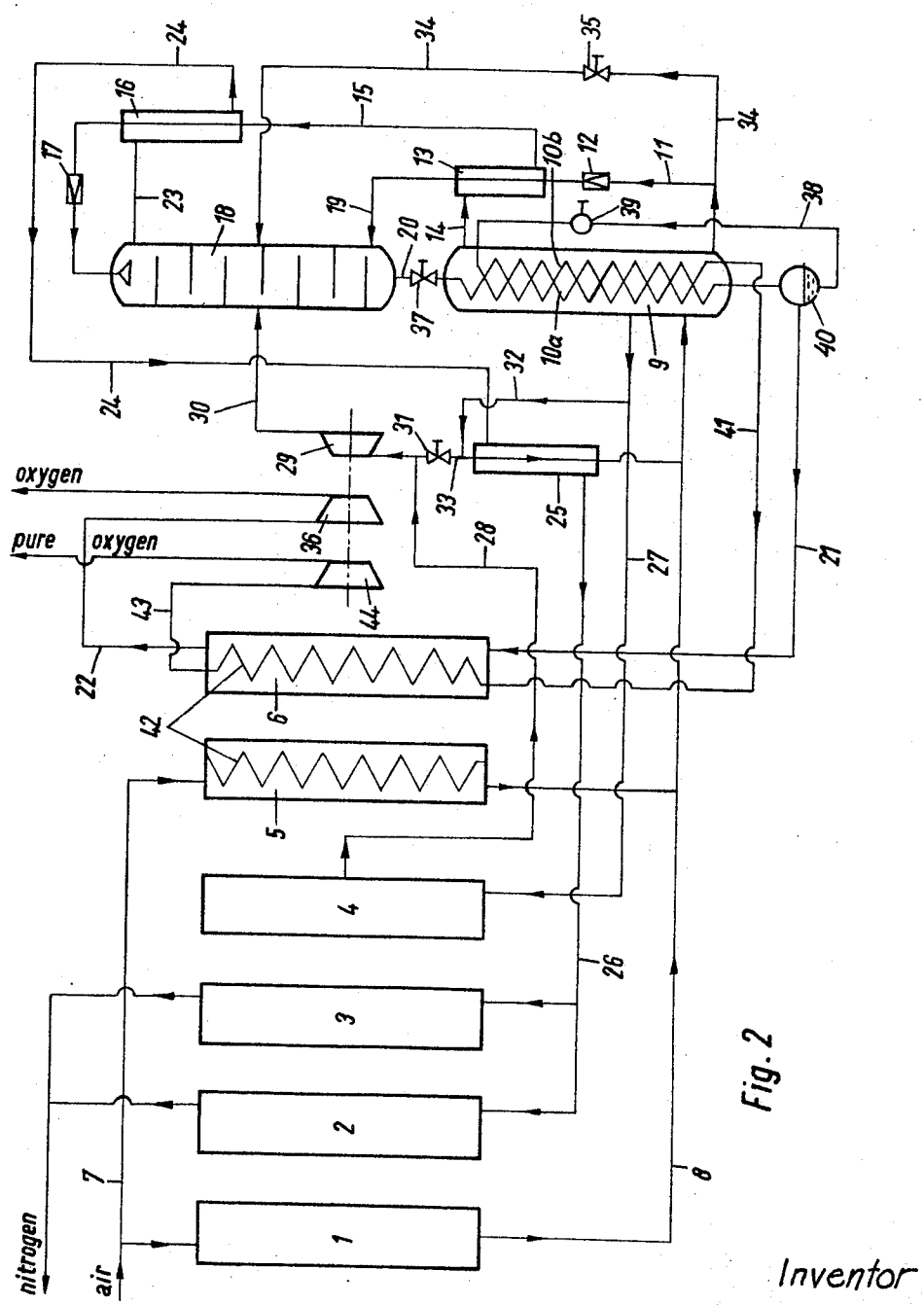
Figure 3:
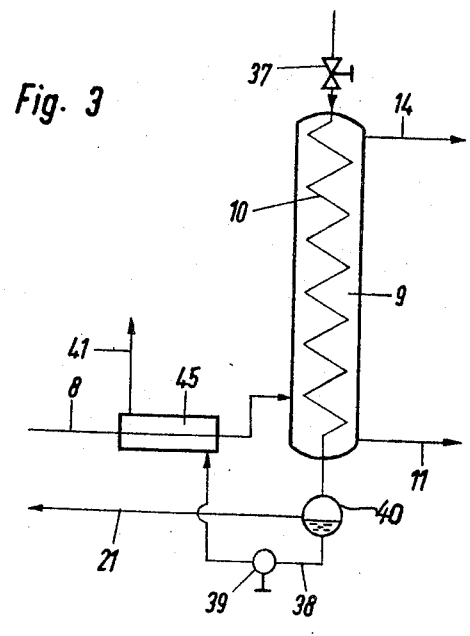

Other objects and advantages of this invention will be apparent upon reference to the accompanying description when taken in conjunction with the following drawings, wherein FIGURE 1 is a schematic view of an installation for the separation of air wherein oxygen having a purity of about 70% is produced;

FIGURE 2 is a schematic view of an installation for the separation of air wherein both moderately pure oxygen and oxygen having a purity of more than 90% are produced; and FIGURE 3 is a schematic view of several components which are an alternative structure to one phase of the process illustrated in FIGURE 2.

It should be borne in mind that the schematic views of the drawings show only those conduits through which substances flow at a certain stage of operation of the process. Accordingly, various switch valves and other accessory components which do not directly refer to the invention are not shown in the drawings for purposes of clarity.

Returning now to the drawings, wherein like reference symbols indicate the same parts throughout the various views, the installation shown in FIGURE 1 comprises a plurality of regenerators 1 through 6 for cooling the air to be separated to a temperature at the point of condensation and for heating the separation products to the ambient temperature. The regenerators are connected so that their functions may be cyclically interchanged at predetermined intervals of time in a manner known in the art.

The air which is to be separated is compressed to a pressure of about 3.5 atmospheres absolute and is introduced through supply line 7 to regenerators 1 and 5 within which the air is cooled from the ambient temperature to the temperature at the point of condensation. At the same time carbon dioxide and other impurities are removed from the air in the regenerators.

It is pointed out that in the known low-temperature two stage rectification processes for the separation of air the incoming air is compressed to a pressure of about 5.5 atmospheres absolute. Since the present invention only compresses the air to 3.5 atmospheres absolute, it is readily apparent that a considerable savings in energy is effected with respect to the compression of the air.

The cooled and purified air is then discharged from the outlet ends of the regenerators 1 and 5 to a conduit 8 which admits the air to the lower part of a first or preseparating stage 9 of a two stage rectification column. This preseparating stage 9 is, in essence, a unidirectional flow evaporator since both the liquids in the heat exchanger coil 10 and in the evaporator 9 itself flow in the same direction, i.e. downwardly. This will be presently described in detail.

As the air flows upwardly through the preseparating stage 9, where it is at a pressure of about 2.5 to 4 atmospheres absolute, the air is partially condensed at decreasing temperatures by heat-exchange with liquid oxygen flowing downwardly through the coil 10. Oxygen-rich liquid is produced by this heat-exchange and accumulates in the bottom of the preseparating stage 9. This liquid is then withdrawn as an intermediate product and flowed through conduit 11 wherein it is expanded in an expansion valve 12 and introduced to the first flow path of a heat exchanger 13.

The residual gas mixture accumulating in the preseparating stage 9 from the partial condensation of the air is withdrawn from the top of the preseparating stage 9 through conduit 14 and passed through the second flow path of the heat exchanger 13 in heat-exchange relationship with the oxygen-rich intermediate product.

This nitrogen-rich residual gas mixture condenses in the heat exchanger 13 at a pressure of approximately 3.5 atmospheres absolute and is withdrawn therefrom through a line 15. The line 15 conveys the nitrogen-rich liquid through a heat exchanger 16, an expansion valve 17 and to the head of the main separating stage 18. This liquid gas is subcooled in the heat exchanger 16, expanded in the expansion valve 17 to a pressure of about 1.5 atmospheres absolute, and then used in the main separating stage 18 as a reflux liquid for the rectification.

The liquid intermediate product is evaporated in the heat exchanger 13 and withdrawn therefrom through a line 19 where it is introduced into the lower portion of the main separating stage 18. This intermediate product is rectified therein in counterflow to the remainder of the liquid gas mixture. This rectification produces liquid oxygen which accumulates in the sump of the main stage 18 from which it is withdrawn through a line 20 and expanded in an expansion valve 37 at a pressure of about 0.2 to 1.2 atmospheres absolute.

This expanded liquid oxygen is then introduced to the top end of the heat exchanger coil 10 wherein it is evaporated in heat-exchange to the counterflowing air under a pressure of approximately 0.8 to 1.1 atmospheres absolute. The resulting gaseous oxygen is drawn off from the lower end of the coil 10 through a conduit 21 which conveys the gaseous oxygen to the outlet end of the regenerator 6 within which it is heated to the ambient temperature. This oxygen is then drawn off from the regenerator 6 through conduit 22 by a vacuum pump 36. The oxygen may then be compressed to the pressure necessary for further subsequent treatment.

The lower boiling point gaseous residual product produced by the rectification in the main stage 18, which is essentially nitrogen, is withdrawn therefrom through a conduit 23 and supplied to the second flow path of the heat exchanger 16. Therein this residual product is heated by the reflux liquid flowing from the conduit 15 and is withdrawn from the heat exchanger 16 by conduit 24 and conveyed to a further heat exchanger 25. The residual product is further heated in the heat exchanger 25 and withdrawn therefrom through conduit 26 to be admitted to the outlet ends of regenerators 2 and 3. The passing of the residual product through the regenerators precools them and scavenges the regenerators from impurities deposited therein from the purification of the incoming air.

In order to further heat the residual product in the heat exchanger 25, a gas mixture is withdrawn from the preseparating stage 9 through conduit 32 and is condensed in the heat exchanger 25. The liquid gas mixture emerging from the heat exchanger 25 is then combined with the precooled air in the conduit 8 and introduced into the preseparating stage 9.

In order to compensate for cold losses in the installation, a gas mixture is withdrawn from the preseparating stage 9 through conduit 27 and heated in regenerator 4. The heated gas mixture is then withdrawn from the regenerator 4 and introduced into the inlet of an expansion turbine 29 through conduit 28. The expanded gas mixture is discharged from the turbine through conduit 30 and supplied to the main stage 18 between the top and bottom thereof.

The point at which the gas mixture is supplied to the main stage is is so selected with respect to the point on the stage 9 from which the gas mixture is withdrawn, that the composition of the gas mixture corresponds approximately to the composition of the vapor rising in the main stage 18.

The energy released in the expansion turbine 29 by the expansion of the gas mixture is utilized to drive the vacuum pump 36 which is mechanically coupled to the turbine.

In order to regulate the heat balance of the process, a portion of the gas mixture withdrawn from the preseparating stage 9 through the conduits 27 and 32 is directly introduced into the inlet of the turbine 29 after passing through a regulating valve 31. This portion of the gas mixture used for regulating of the heat balance is not first heated in the regenerator 4.

In order to regulate the evaporation process, a bypass conduit 34 having an expansion valve 35 therein is connected around the heat exchanger 13. A portion of the liquid intermediate product withdrawn from the sump of the preseparating stage 9 can be expanded in the valve 35 and introduced to the main separating stage 18 at a point between the head and bottom thereof.

It is thus apparent that the invention as described in connection with FIGURE 1 has the advantage that the mechanical work of the expansion turbine can be utilized while, on the other hand, the pressure of the gas mixture to be separated can be reduced.

Furthermore, it should be noted that a fractional condensing is accomplished by conducting the air to preseparating stage 9 through the pipe 8 and advancing it upwardly through the stage. As condensation of the air occurs, the liquid rich in oxygen flows downwardly through stage 9 to accumulate on the bottom thereof. The liquid oxygen flowing downwardly through the coil 10 also flows in the same direction.

Proceeding next to FIGURE 2 there is schematically illustrated an installation for the separation of air and producing moderately pure oxygen, such as used in metallurgical or smelting plants and also as a subproduct, pure oxygen having impurities of less than 10%. In the installation of FIGURE 2 only a portion of the liquid oxygen produced in the main stage 18 is evaporated in the coil 10 of the preseparating stage 9. Further, the preseparating stage 9 is provided with two heat-exchange coils 10a and 10b.

The liquid oxygen is introduced into the upper end of coil 10a through expansion valve 37 wherein it is expanded to a pressure of about 0.8 to 1.2 atmospheres absolute. When the liquid oxygen is partially evaporated in the coil 10a, a mixture is produced consisting of moderately pure oxygen and a liquid rich in oxygen which mixture is collected in a separator 40. The liquid rich in oxygen and the moderately pure oxygen are then in equilibrium in this separator. This liquid has a higher concentration of oxygen than if the liquid oxygen entering the coil 10a was completely evaporated.

The moderately pure oxygen is drawn off from the separator 40 through the conduit 21, regenerator 6 and vacuum pump 36 in a manner as described for the installation of FIGURE 1.

The oxygen-rich liquid is withdrawn from the separator 40 through conduit 38, again expanded in an expansion valve 39 and then introduced into the top of the second heat exchanger coil 10b of the preseparating stage 9. This liquid, having the high concentration of oxygen, is then evaporated in the coil 10b to produce a pure oxygen having a purity of more than 90%. This pure oxygen is then withdrawn through the conduit 41 and introduced into a cooling coil 42 in the regenerator 6. The gaseous oxygen is heated to the ambient temperature in the cooling coil 42. The pure oxygen is then removed from the regenerator 6 through the conduit 43 by a vacuum pump 44 and then discharged from the installation as a sub-product. The vacuum pump 44 can be mechanically coupled with the expansion turbine 29 or it can be driven by a separate power plant.

Except as described above, the remainder of the process of FIGURE 2 is similar to the process as as described for the installation of FIGURE 1.

It is not necessary that the oxygen-rich liquid accumulating in the separator 40 be passed through the preseparating stage 9. This modified process discloses that this oxygen-rich liquid must be passed in heat-exchange relationship with the precooled air. Other alternative structures for evaporating the liquid rich in oxygen accumulating in the separator 40 can be employed. One such alternative structure is schematically illustrated in FIGURE 3.

In FIGURE 3 the precooled air flowing through the conduit 8 is passed through a flow path of a heat exchanger 45 and therein partially liquefied. This mixture of liquid and gas is introduced into the preseparating stage 9 at the lower part thereof and a further portion of the gas condenses by passing in heat-exchange relationship with the coil 10.

A liquid intermediate product is withdrawn from the preseparating stage 9 through the conduit 11 in the manner as described above and the residual gas mixture is withdrawn from the upper portion of the stage 9 through conduit 14.

The liquid oxygen produced in the main stage 18 is similarly withdrawn therefrom through conduit 20, expanded in expansion valve 37 and introduced into the cooling coil 10 wherein it is partially evaporated. This partial evaporation of the liquid oxygen produces a mixture of moderately pure oxygen and a liquid rich in oxygen which mixture is collected in the separator 40. The moderately pure oxygen is drawn off from the separator 40 in the gaseous state through coniduit 21.

However, the liquid having the high concentration of oxygen therein is drawn off from the separator 40 through conduit 38, expanded in expansion valve 39 and then passed through the heat exchanger 45 in heat-exchange relationship with the incoming precooled air in the conduit 8. The liquid is evaporated in the heat exchanger 45 and is then conveyed to the regenerator 6 through conduit 41 in a manner as described above.

It is thus apparent that the modification of FIGURE 3 differs from the modification of FIGURE 2 only in that the second cooling coil 10b is eliminated in the preseparating stage 9 and is replaced by an additional heat exchanger 45. The remaining structure and operation of the process and apparatus are similar as described above.

While the present invention has been specifically disclosed for the separation of air and the production of moderately pure oxygen, it is pointed out that this installation and the process disclosed herein can also be used for the separation of other gas mixtures.

It will be understood that this invention is susceptible to modification in order to adapt it to different usages and conditions and, accordingly, it is desired to comprehend such modifications within this invention as may fall within the scope of the appended claims.

What is claimed as this invention is:

1. A method of separating a gas mixture by two stage low-temperature rectification to produce a higher boiling point main product and a lower boiling point residual product, and comprising the steps of partially condensing in the first stage at decreasing temperatures the gas mixture to be separated at a pressure of about 2.5 to 4 atmospheres absolute to rectify the gas mixture therein and to produce a liquid intermediate product and a residual gaseous mixture, expanding the liquid intermediate product to a pressure in the range of about 1.2 atmospheres absolute to 2.0 atmospheres absolute, counterflowing the expanded liquid intermediate product and the residual gaseous mixture in heat exchange relationship to each other to evaporate the liquid intermediate product and to liquefy the residual gaseous mixture, withdrawing the lower boiling point residual product in the gaseous state from the upper part of the second stage, counterflowing the lower boiling point residual product and the liquefied residual gaseous mixture in heat exchange relationship to subcool the liquefied residual gaseous mixture, expanding the liquefied residual gaseous mixture, introducing the expanded liquefied residual gaseous mixture into the second stage as a refluxing agent, rectifying the gaseous intermediate product introduced into the bottom portion of the second stage to obtain the liquid main product in the lower part thereof, discharging the liquefied main product from the lower part of the second stage and expanding the same to a pressure in the range of about 0.2 atmospheres absolute to 1.2 atmospheres absolute, counterflowing in the first stage the liquid main product and the gas mixture to be separated to evaporate the main product and for partially condensing the gas mixture, and withdrawing the evaporated main product from the first stage and heating the same.

2. A method of separating a gas mixture by two stage low-temperature rectification to produce a higher boiling point main product and a lower boiling point residual product, and comprising the steps of partially condensing in the first stage at decreasing temperatures the gas mixture to be separated to a pressure in the range of about 2.5 to 4 atmospheres absolute to rectify the gas mixture therein and to produce a liquid intermediate product and a resdiual gaseous mixture, expanding the liquid intermediate product to a pressure in the range of about 1.2 to 2 atmospheres absolute, counterflowing the expanded liquid intermediate product and the residual gaseous mixture in heat exchange relationship to each other to evaporate the liquid intermediate product and to liquefy the residual gaseous mixture, withdrawing the lower boiling point residual product in the gaseous state from the upper part of the second stage, counterflowing the lower boiling point residual product and the liquefied residual gaseous mixture in heat exchange relationship to subcool the gaseous lower boiling point residual product, expanding the liquefied residual gaseous mixture, introducing the same into the second stage as a refluxing agent, rectifying the gaseous intermediate product in the second stage to obtain the liquid main product in the lower part thereof, discharging the liquefied main product from the lower part of the second stage and expanding the same to a pressure in the range of about 0.8 to 1.2 atmospheres absolute, counterflowing in the first stage the liquid main product and the gas mixture to be separated in heat exchange relationship for partially condensing the gas mixture and to partially evaporate the main product to obtain the main product in both the gaseous and liquid states, separating the gaseous and liquid states of the main product, withdrawing the evaporated main product in the gaseous state and heating the same further, expanding the liquid main product to a subatmospheric pressure in the range of 0.2 to 1 atm. absolute, and counterflowing in the first stage in heat exchange relationship to each other the expanded liquid main product and the gas mixture to be separated.

3. An arrangement for separating a gas mixture by two stage low-temperature rectification to produce a higher boiling point main product and a lower boiling point residual product, and comprising a plurality of regenerators cyclically connected to a source of a gas mixture to be separated, a two stage rectification column with the first stage thereof having a heat-exchanging coil therein and having the lower portion thereof connected to the outlets of said regenerators to receive the gas mixture therefrom, a first heat exchanger having first and second flow paths and an expansion valve with said first flow path and said expansion valve connected between the lower part of the first stage of said rectification column and the lower part of the second stage of said column, the second flow path of said first heat exchanger being connected to the top of said first stage, a second heat exchanger having first and second flow paths with the first flow path thereof being connected to the second flow path of said first heat exchanger, second expansion means connected between the head of said second stage and the first flow path of said second heat exchanger, the second flow path of said second heat exchanger being connected between the upper part of said second stage and the outlets of a plurality of the remaining of said regenerators whereby the residual gas product withdrawn from said second stage is heated in said regenerators prior to being discharged from the arrangement, a connection between the sump of said second stage and one end of the heat-exchanging coil of said first stage whereby liquid main product is evaporated in said coil and the gas mixture received in said first stage is partially condensed, means for withdrawing the gaseous main product from the other end of said heat exchanger coil and through another one of said regenerators to heat the main product therein, and a bypass line having an expansion device therein connecting the sump of said first stage with the second stage between the top and bottom thereof.

4. An arrangement for separating a gas mixture as claimed in claim 3 and further comprising a line connecting said first stage between the top and bottom thereof to another of said regenerators and to said second stage between the top and bottom thereof, there being an expansion engine in said line between said regenerator and said second stage, a third heat exchanger having first and second flow paths with the first flow path thereof being connected between said second heat exchanger and the outlets of a plurality of regenerators, the second flow path of said third heat exchanger being connected between the top and bottom of said first stage and the lower part of said first stage, and a connection between the top and bottom of said first stage and the inlet of said expansion engine and having a controlling valve therein.

5. An arrangement for separating a gas mixture by two stage low-temperature rectification to produce a higher boiling point main product and a lower boiling point residual product, and comprising a two stage rectification column with the first stage thereof having first and second heat exchanger coils therein and the lower portion of said first stage being connected to the outlets of said regenerators to receive the gas mixture therefrom, a first heat exchanger having first and second flow paths and an expansion valve with said first flow path and said expansion valve connected between the lower part of the first stage of said rectification column and the lower part of the second stage of said column, the second flow path of said first heat exchanger being connected to the top of said first stage, a second heat exchanger having first and second flow paths with the first flow path thereof being connected to the second flow path of said first heat exchanger, second expansion means connected between the head of said second stage and the first flow path of said second heat exchanger, the second flow path of said second heat exchanger being connected between the upper part of said second stage and the outlets of a plurality of the remaining of said regenerators whereby the residual gas product withdrawn from said second stage is heated in said regenerators prior to being discharged from the arrangement, a connection including an expansion valve between the sump of said second stage and one end of the first heat exchanger coil of said first stage whereby the liquid main product is partially evaporated in said first heat exchanger coil and the gas mixture received in said first stage is partially condensed therein, a separator connected to the other end of said first heat exchanger coil, a vacuum pump to withdraw the gaseous main product from said separator and through another one of said regenerators to heat the main product therein, a connecting line including an expansion valve between the lower portion of said separator and the upper end of said second heat exchanger coil of said first stage to evaporate the liquid main product therein, a vacuum pump connected to said another one of said regenerators and to the outlet of said second heat exchanger coil to withdraw the gaseous main product from said second heat exchanger coil and through said regenerator, a bypass line having an expansion valve therein connecting the sump of said first stage with the second stage between the top and bottom thereof, a line connecting said first stage between the top and bottom thereof to another of said regenerators and from a middle portion of said regenerator to said second stage between the top and bottom thereof, there being an expansion engine in said line between said regenerator and said second stage, a third heat exchanger having first and second flow paths with the first flow path thereof being connected between said second heat exchanger and the outlets of a plurality of regenerators, the second flow path of said third heat exchanger being connected between the top and bottom of said first stage and the lower part of said first stage, and a connection between the top and bottom of said first stage and the inlet of said expansion engine and having an expansion valve therein.

6. A method of separating a gaseous mixture into a higher boiling point main product and a lower boiling point residual product by low temperature rectification, which method comprises
    (a) cooling the gas mixture in heat exchange relationship with the separation products thereby freeing the gas mixture from condensible impurities;
    (b) conducting the cooled gaseous mixture into the bottom section of an elongated substantially vertical partial condensing zone;
    (c) condensing a portion of said mixture in order to obtain a main product-rich liquid intermediate product at the bottom section of said partial condensing zone and a residual product-rich gas at the top of said partial condensing zone;
    (d) lowering the pressure exerted on said liquid intermediate product;
    (e) conducting the said lower pressure main product-rich liquid intermediate product in indirect heat exchange relationship with said residual product-rich vapor, thereby vaporizing the liquid intermediate product and condensing the residual product-rich vapor;

(f) conducting the resultant main product-rich vapor into the bottom section of a rectification zone;

(g) withdrawing the lower boiling point residual product in the gaseous state from the top section of the rectification zone and (h) counterflowing this residual product and the liquefied residual product-rich fraction in heat exchange relationship to subcool said liquid residual product-rich fraction;

(i) expanding and passing the resultant residual product-rich liquid to the top section of said rectification zone as reflux liquid;

(k) rectifying said liquid and vapor streams in said rectification zone to obtain a liquid bottom product as the main product and a gaseous top product as the residual product;

(l) expanding the liquid bottom product to a lower pressure;

(m) conducting the expanded liquid bottom product through a first heat-exchange coil substantially traversing the entire length of said partial condensing zone to partially vaporize said liquid bottom product by partially condensing the gas mixture to be separated and to obtain the main product in both the gaseous and liquid states, (n) separating the gaseous and liquid states of the main product;

(o) withdrawing the evaporated main product of moderate purity in the gaseous state and heating the same to ambient temperature;

(p) expanding the liquid main product;

(q) conducting the expanded liquid main product through a second heat exchange coil traversing substantially the entire length of said partial condensing zone to be vaporized by further partially condensing said gaseous mixture to be separated; and (r) heating the resultant evaporated main product of higher purity to ambient temperature by passing it through a coil in heat exchange relaionship with the crude gas mixture to be separated.

7. A method of separating a gaseous mixture into a higher boiling point main product and a lower boiling point residual product by low temperature rectification, which method comprises (a) cooling the gas mixture in heat exchange relationship with the separation products thereby freeing the gas mixture from condensible impurities;

(b) conducting the cooled gaseous mixture into the bottom section of an elongated substantially vertical partial condensing zone;

(c) condensing a portion of said mixture in order to obtain a main product-rich liquid intermediate product at the bottom section of said partial condensing zone and a residual product-rich gas at the top of said partial condensing zone;

(d) lowering the pressure exerted on said liquid intermediate product;

(e) conducting the said lower pressure main product-rich liquid intermediate product in indirect heat exchange relationship with said residual product-rich vapor, thereby vaporizing the liquid intermediate product and condensing the residual product-rich vapor;

(f) conducting the resultant main product-rich vapor into the bottom section of a rectification zone;

(g) withdrawing the lower boiling point residual product in the gaseous state from the top section of the rectification zone and (h) counterflowing this residual product and the liquefied residual product-rich fraction in heat exchange relationship to subcool said liquid residual product-rich fraction;

(i) expanding and passing the resultant residual product-rich liquid to the top section of said rectification zone as reflux liquid;

(k) rectifying said liquid and vapor streams in said rectification zone to obtain a liquid bottom product as the main product and a gaseous top product as the residual product;

(l) expanding the liquid bottom product to a lower pressure;

(m) conducting the expanded liquid bottom product through a first heat-exchange coil substantially traversing the entire length of said partial condensing zone to partially vaporize said liquid bottom product by partially condensing the gas mixture to be separated and to obtain the main product in both the gaseous and liquid states;

(n) separating the gaseous and liquid states of the main product;

(o) withdrawing the evaporated main product of moderate purity in the gaseous state and heating the same to ambient temperature;

(p) expanding the liquid main product;

(q) conducting the expanded liquid main product through a heat exchanger in heat exchange relationship with the gas mixture to be separated before its entrance into said partial condensing zone in order to evaporate the liquid main product; and (r) heating the resultant evaporated main product of higher purity to ambient temperature by passing it through a coil in heat exchange relationship with the crude gas mixture to be separated.

8. A method of separating air into a higher boiling point oxygen product of moderate purity and a lower boiling point residual product of essentially nitrogen by low temperature rectification, which method comprises:

(a) compressing air to a relatively low pressure of about 3.5 atmospheres absolute;

(b) cooling the compressed air in heat exchange relationship with the separated product thereby freeing the air from condensible impurities;

(c) conducting the cooled air into the bottom section of an elongated, substantially vertical partial condensing zone;

(d) condensing a portion of the air to obtain an oxygen-rich liquid intermediate product at the bottom section of said partial condensing zone and a nitrogen-rich gas at the top of said partial condensing zone;

(e) lowering the pressure of said liquid intermediate product;

(f) conducting the resultant lower pressure liquid intermediate product in indirect heat exchange relationship with the nitrogen-rich gas thereby vaporizing the liquid intermediate product, and condensing the nitrogen-rich gas;

(g) conducting the resultant oxygen-rich intermediate vapor into the bottom section of a rectification zone;

(h) withdrawing the lower boiling point residual product in the gaseous state from the top of the rectification zone and counterflowing the same and the liquefied nitrogen-rich fraction from step (f) in heat exchange relationship to subcool said liquefied nitrogen-rich fraction;

(i) expanding and passing the resultant nitrogen-rich liquid to the top section of said rectification zone as reflux liquid;

(j) rectifying the liquid and vapor streams in said rectification zone to obtain a liquid bottom product as the oxygen product and a gaseous top product as the residual product;

(k) expanding the liquid oxygen bottom product to a lower pressure in the range of 0.2 to 1.2 atm. absolute;

(l) conducting the expanded liquid-oxygen bottom product down through a heat exchange coil substantially traversing the entire length of said partial condensing zone and vaporizing the same by partially condensing the compressed air to be separated;

(m) heating the resultant gaseous oxygen and residual products to ambient temperature in heat exchange relationship with the crude air to be separated, thereby revaporizing the condensed impurities; and (n) exhausting solely said oxygen product resulting from step (l) and delivering it for use.

References Cited by the Examiner

UNITED STATES PATENTS

| | | | |
|---|---|---|---|
| 1,785,491 | 12/1930 | Messer | 62—31 X |
| 2,002,940 | 5/1935 | Frankel | 62—13 X |
| 2,066,115 | 12/1936 | Linde | 62—29 X |
| 2,209,748 | 7/1940 | Schlitt | 62—31 X |
| 2,520,862 | 8/1950 | Swearingen | 62—29 |
| 2,622,416 | 12/1952 | Ogotzaly | 62—14 |
| 2,626,510 | 1/1953 | Schilling | 62—29 X |
| 2,655,796 | 10/1953 | Rice | 62—14 |
| 2,666,303 | 1/1954 | Schuftan | 62—39 |
| 2,688,238 | 9/1954 | Schilling. | |
| 2,697,922 | 12/1954 | Schilling | 62—13 |
| 2,753,698 | 7/1956 | Jakob | 62—14 X |
| 2,822,675 | 2/1958 | Grenier | 62—31 X |
| 2,850,880 | 9/1958 | Jakob | 62—13 X |
| 2,895,304 | 7/1959 | Wucherer et al. | 62—13 |
| 2,982,108 | 5/1961 | Grunberg | 62—28 |
| 3,066,494 | 12/1962 | Potts | 62—14 X |

NORMAN YUDKOFF, *Primary Examiner.*

RICHARD A. O'LEARY, *Examiner.*

V. W. PRETKA, J. JOHNSON, L. L. KING,
*Assistant Examiners.*